Patented Dec. 3, 1940

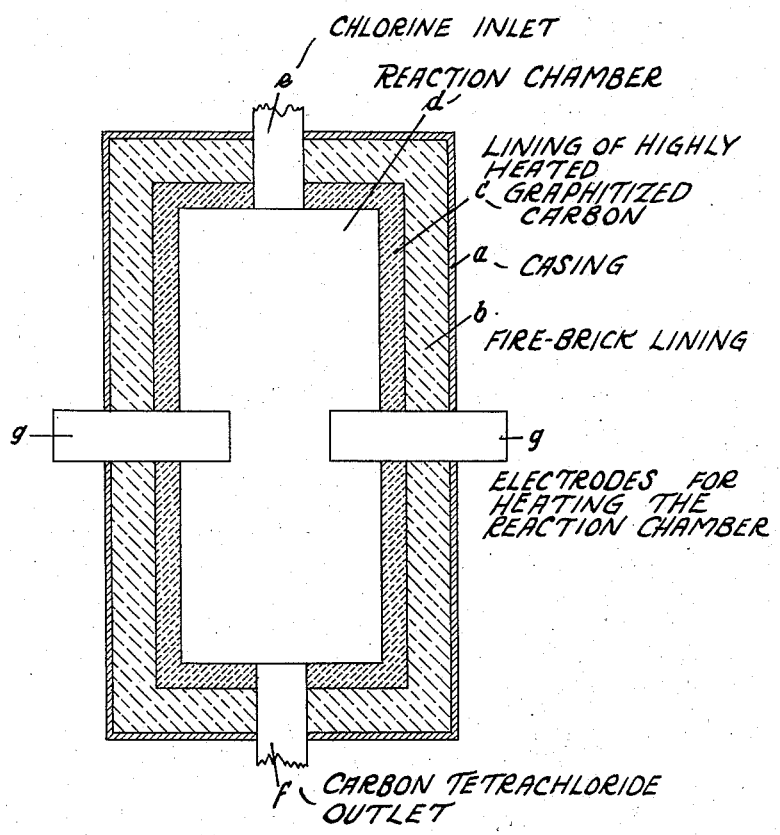

2,223,448

UNITED STATES PATENT OFFICE 2,223,448

PROCESS FOR MANUFACTURING CARBON TETRACHLORIDE

Bruno Hennig, Bitterfeld, Germany, assignor, by mesne assignments, to General Aniline & Film Corporation, New York, N. Y., a corporation of Delaware Application October 12, 1937, Serial No. 168,585
In Germany November 19, 1936

4 Claims. (Cl. 260—664)

The present invention relates to the manufacture of carbon tetrachloride and to an improved furnace for use therein.

One of its objects is to provide a new lining of a furnace for producing carbon tetrachloride starting from carbon and chlorine.

Further objects of the invention will be seen from the detailed specification following hereafter.

The accompanying drawing shows schematically the furnace in a longitudinal section, which is to be used for producing carbon tetrachloride.

It is known that carbon tetrachloride can be made by combining carbon and chlorine in the presence of sulfur compounds at a high temperature (exceeding 900° C.). A serious hindrance to the practice of this process on the commercial scale has been the lack of a sufficiently resistant construction material for the reaction space. It is in fact a common characteristic of all ceramic construction materials that, at the temperature at which carbon tetrachloride is formed, at least one of their oxide constituents becomes decomposed and volatilized as a chloride in the presence of carbon or carbon monoxide and chlorine so that the walls of the reaction space are rapidly destroyed. Construction materials which have not an oxide bases, such as silicon carbide and other carbides, are also incapable of withstanding for a sufficiently long period the combined attack of chlorine, carbon or carbon monoxide and the sulfur generally used as catalyst or the sulfur compounds formed as intermediate products.

This invention is based on the surprising observation that the chlorination of for example wood charcoal, lignite coke, active carbon and similar carbonization products can be conducted in a satisfactory manner by using for lining the reaction furnace a carbon which has been heated at a high temperature and is of the nature of an electrode carbon. This form of carbon is indeed also attacked per se by chlorine under the conditions required for the manufacture of carbon tetrachloride, as is shown by the experiments described hereinafter, but in the presence of varieties of carbon which react more easily with chlorine its decomposition is completely suppressed so that the highly heated carbon remains practically unchanged. This peculiar behavior of the highly heated carbon or graphite is illustrated by the following comparative experiments:

A piece of graphite which has been produced at a temperature about 2600° C. and a piece of non-graphitic carbon which has been heated at about 1400° C. are heated in a porcelain tube for 100 hours at 1100° C. in the vapor of sulfur chloride. At the end of this experiment the graphite and the non-graphitic highly heated carbon have become friable and have in part disintegrated. The loss in weight amounts to 36 per cent of the original weight in the case of the non-graphitic highly heated carbon and to 28 per cent. of the original weight in the case of the graphite.

In a comparative experiment non-graphitic highly heated carbon and graphite are treated under exactly the same conditions but in admixture with small pieces of wood charcoal. In this case the loss in weight amounts in the case of the non-graphitic highly heated carbon to 0.35 per cent. and in the case of the graphite to 0.3 per cent., calculated on the original weights. These insignificant losses in weight can be attributed practically entirely to expelled moisture.

The foregoing observation permits the manufacture of carbon tetrachloride in a furnace whose lining consists of a carbon mass which has been heated at a high temperature, there being used for charging the furnace an easily reacting carbon, for example wood charcoal, lignite coke or a similar carbonization product.

For the furnace lining there are particularly suitable shaped pieces of so-called electrode carbon or "carbon bricks," which are prepared in known manner from certain varieties of coke by shaping with the aid of a binding agent and have been subjected to a heating process and if required to graphitization.

For heating the furnace charge at temperatures above a red heat use may be made of a known method, such as in particular internal electric heating, advantageously in such a manner that the charge is heated to a higher temperature than the furnace lining.

In the accompanying drawing showing schematically the furnace in a longitudinal section, $a$ is a cast-iron casing provided with a lining $b$ consisting of fire-bricks. $c$ is the lining of a carbon which has been heated at a high temperature and, if required, graphitized. The chlorine is introduced into the reaction chamber $d$, which during the processing, is filled with wood charcoal through the pipe $e$. The carbon tetrachloride formed leaves the furnace through $f$. $g$ are electrodes for heating the furnace. It is obvious that other requisites, such as means for continuously filling-in wood charcoal, for removing non-volatile residues, likewise may be provided.

What I claim is:

1. In the manufacture of carbon tetrachloride by the reaction of easily-reacting charcoal and chlorine in the presence of a sulfur catalyst, the improvement which comprises confining the reactants within a reaction chamber the inner surface of which is substantially completely made of carbon which has been heated at temperatures above 1400° C.

2. In the manufacture of carbon tetrachloride by the reaction of easily-reacting charcoal and chlorine in the presence of a sulfur catalyst, the improvement which comprises confining the reactants within a reaction chamber the inner surface of which is made of electrode carbon which has been heated at temperatures above 1400° C.

3. In the manufacture of carbon tetrachloride by the reaction of easily-reacting charcoal and chlorine in the presence of a sulfur catalyst, the improvement which comprises confining the reactants within a reaction chamber the inner surface of which is made of carbon bricks which has been heated at temperatures above 1400° C.

4. In the manufacture of carbon tetrachloride by the reaction of easily-reacting charcoal and chlorine in the presence of a sulfur catalyst, the improvement which comprises confining the reactants within a reaction chamber the inner surface of which is made of graphitized carbon which has been heated at temperatures above 1400° C.

BRUNO HENNIG.